United States Patent
Calloway

(10) Patent No.: US 10,482,668 B2
(45) Date of Patent: Nov. 19, 2019

(54) MINIATURE VISION-INERTIAL NAVIGATION SYSTEM WITH EXTENDED DYNAMIC RANGE

(71) Applicant: THALES VISIONIX, INC., Clarksburg, MD (US)

(72) Inventor: Thomas Calloway, Dracut, MA (US)

(73) Assignee: THALES VISIONIX, INC., Clarksburg, MD (US)

(*) Notice: Subject to any disclaimer, the term of this patent is extended or adjusted under 35 U.S.C. 154(b) by 121 days.

(21) Appl. No.: 15/609,669

(22) Filed: May 31, 2017

(65) Prior Publication Data
US 2017/0352190 A1    Dec. 7, 2017

Related U.S. Application Data

(60) Provisional application No. 62/344,843, filed on Jun. 2, 2016.

(51) Int. Cl.
*G06T 19/00* (2011.01)
*G02B 27/01* (2006.01)

(52) U.S. Cl.
CPC ........ *G06T 19/006* (2013.01); *G02B 27/0172* (2013.01); *G02B 2027/014* (2013.01); *G02B 2027/0118* (2013.01); *G02B 2027/0138* (2013.01)

(58) Field of Classification Search
CPC .............. G06T 19/006; G02B 27/0172; G02B 2027/0118; G02B 2027/0138; G02B 2027/014
See application file for complete search history.

(56) References Cited

U.S. PATENT DOCUMENTS

| 8,762,091 B1 | 6/2014 | Foxlin et al. |
| 9,766,074 B2* | 9/2017 | Roumeliotis .......... G01C 21/16 |
| 2012/0078510 A1* | 3/2012 | Ma ....................... G01C 21/165 701/426 |

(Continued)

OTHER PUBLICATIONS

International Search Report and Written Opinion of related International Patent Application No. PCT/US17/35680 dated Dec. 20, 2017.

*Primary Examiner* — Wing H Chow
(74) *Attorney, Agent, or Firm* — Arent Fox LLP

(57) ABSTRACT

A system and method for tracking positions of objects in an actual scene in a wide range of lighting conditions. A vision-inertial navigation system is provided that may be configured to track relative positions of objects of interest in lighting conditions ranging from, e.g., typical indoor lighting conditions to direct sunlight to caves with virtually with no light. The navigation system may include two or more helmet-mounted cameras each configured to capture images of the actual scene in a different lighting condition. A remote processing element may combine data from the two or more helmet-mounted cameras with data from a helmet-mounted inertial sensor to estimate the position (e.g., 3D location) of the objects. The navigation system may display the estimated position for each object on a transparent display device such that, from a user's perspective, the estimated position for each object is superimposed onto the corresponding object and/or other information relating to the user's and/or object's position is displayed.

20 Claims, 10 Drawing Sheets

(56) References Cited

U.S. PATENT DOCUMENTS

2014/0104143 A1    4/2014   Benson et al.
2015/0309316 A1   10/2015   Osterhout et al.
2015/0317838 A1   11/2015   Foxlin
2016/0088278 A1*   3/2016   Velarde .................. H04N 9/735
                                                      348/371

* cited by examiner

MINIATURE VISION-INERTIAL NAVIGATION SYSTEM WITH EXTENDED DYNAMIC RANGE

CROSS-REFERENCE TO RELATED APPLICATIONS

This application claims priority to Provisional Application No. 62/344,843 filed on Jun. 2, 2016, which is hereby incorporated by reference in its entirety.

BACKGROUND

Field

The present disclosure relates generally to navigation systems, and more particularly, to a miniature vision-inertial navigation system with an extended dynamic range.

Background

Military, police, and firefighters use head-mounted displays to display tactical information, such as maps, while viewing a real scene. For example, a head-mounted display may be used to superimpose tactical information on the real scene to create an augmented reality (AR). One of the technological challenges for creating an AR is to maintain accurate tracking between real and computer-generated objects. As users move their viewpoints, the computer-generated objects must remain aligned with observed positions and orientations of the real objects. Vision-inertial navigation systems may estimate relative position and orientation information by fusing information from a camera and inertial sensors, particularly gyroscopes and accelerometers, to estimate device pose.

However, many vision-inertial navigation systems are not suitable for such uses as military and governmental applications. For example, many vision-inertial navigation systems work only in sunlight conditions, and other systems work only at night. Vision-inertial navigation systems that are able to operate in a wide range of ambient lighting conditions utilize very large sensors or apparatuses that are not wearable. Other vision-inertial navigation systems also require a user to manually perform boresight calibration between the camera and inertial sensors and to manually configure settings such as display brightness.

Thus, there remains an unmet need for a vision-inertial navigation system that is small enough to be worn on the head and able to function in a wide range of dynamic lighting conditions, for example, from typical indoor lighting conditions to direct sunlight conditions to caves with virtually no light. Further, there remains a need for a vision-inertial navigation system that is plug and play.

SUMMARY

In light of the above described problems and unmet needs, the present disclosure provides a system and method for tracking positions of objects in a viewed area (also interchangeable referred to herein as an actual scene) in a wide range of lighting conditions. In an aspect, a vision-inertial navigation system is provided that may be configured to track relative positions (e.g., 3D coordinates) of objects of interest (e.g., people, vehicles, buildings) in an actual scene in lighting conditions ranging from, for example, typical indoor lighting conditions to direct sunlight to locations with virtually with no light (e.g., caves). For example, in an aspect, the vision-inertial navigation system may include two or more helmet-mounted cameras each configured to capture images of the actual scene in different lighting conditions. A remote (e.g., handheld) processing element may then combine the image data from the two or more helmet-mounted cameras with inertial measurement data from a helmet-mounted inertial sensor in order to accurately estimate the position of the objects in the actual scene in real-time. The vision-inertial navigation system may then display the estimated position for each object, such as on a transparent display device that allows, from a user's perspective, the estimated position for each object to be superimposed onto the corresponding object as seen in the actual scene.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
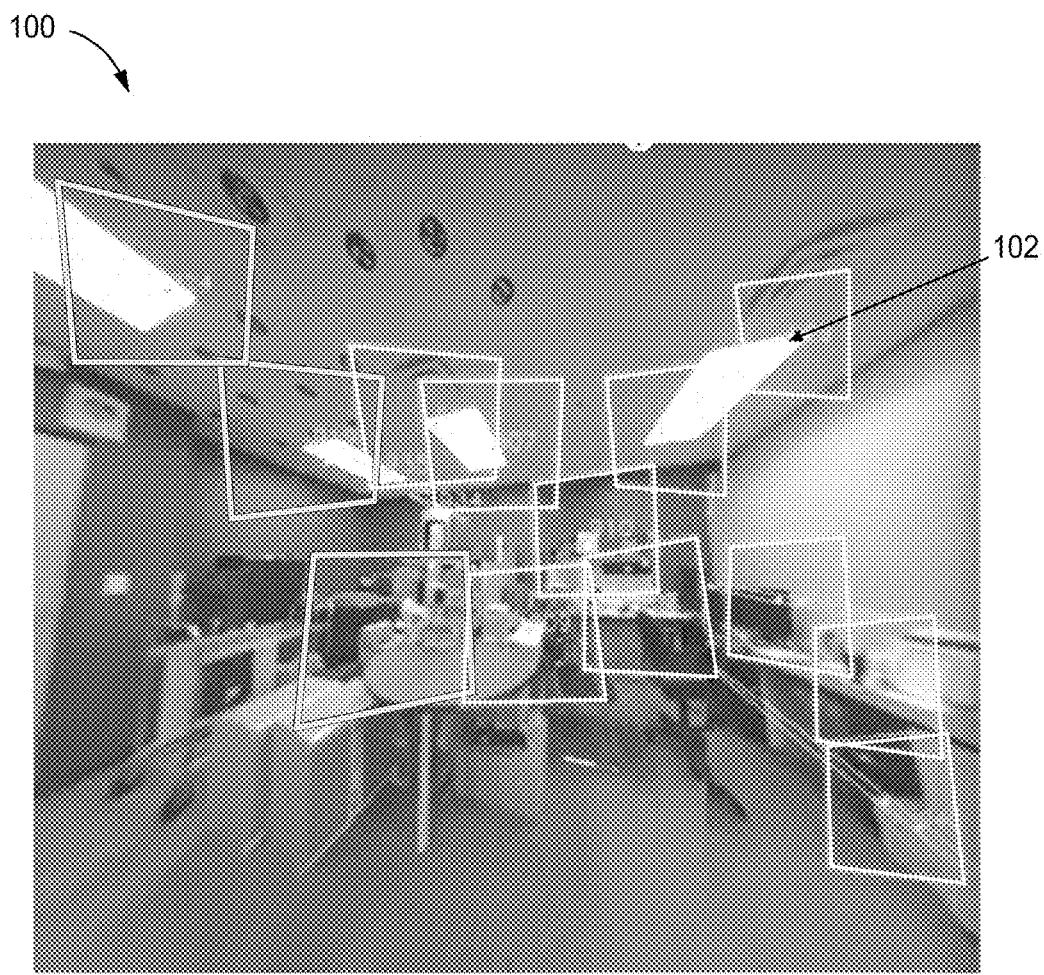
FIG. 1 is a diagram illustrating an example operating environment of an example vision-inertial navigation system in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of navigation features will now be presented with reference to various systems, apparatuses, and methods. These systems, apparatuses, and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, digital versatile disc (DVD), and floppy disk, where disks usually reproduce data magnetically, while discs reproduce data optically with lasers. Combinations of the above should also be included within the scope of computer-readable media.

Generally, among other things, the vision-inertial navigation system and methods disclosed herein are directed to tracking positions of objects in an actual scene in a wide range of lighting conditions. In an aspect, the vision-inertial navigation system may include one or more helmet-mounted navigation subsystems with two or more cameras that each may be configured to capture images of the actual scene in different lighting conditions. The helmet-mounted navigation subsystem may further include an inertial sensor configured to provide measurements of an orientation of the helmet with respect to a ground plane. The vision-inertial navigation system may also include a remote processing element configured to estimate the relative positions of objects in the actual scene by combining image data obtained from the two or more cameras with data obtained from the inertial sensor. In an aspect, the remote processing unit may be configured to provide the estimated positions to a helmet-mounted display pod, such that each of the estimated positions are superimposed on the corresponding object as viewed by the user in the actual scene. For example, referring to FIG. 1, an estimated position 102 of an object (e.g., light fixture) in an actual scene 100 (e.g., indoor office space) may, from a perspective of a person wearing the vision-inertial navigation system, be superimposed on the user's view of the actual scene 100. As the user moves around, a value of each estimated position of the object may be updated to reflect the change in position of the object relative to that of the user (e.g., relative to that of the vision-inertial navigation system). The remote processing unit may further be configured to estimate and track the position and orientation of the user (e.g., of the vision-inertial navigation system) as the user moves along a path based on the combined image data from the two or more cameras and the data from the inertial sensor. In an additional or alternative aspect, the remote processing unit may be configured to provide the estimated position and orientation of the user to the helmet-mounted display pod, such that visual information representing the tracked path of the user is superimposed on the user's view of the actual scene 100. It is to be appreciated that other information relating to the user's and/or object's position may be superimposed on the user's view of the actual scene 100.

Figure 2:
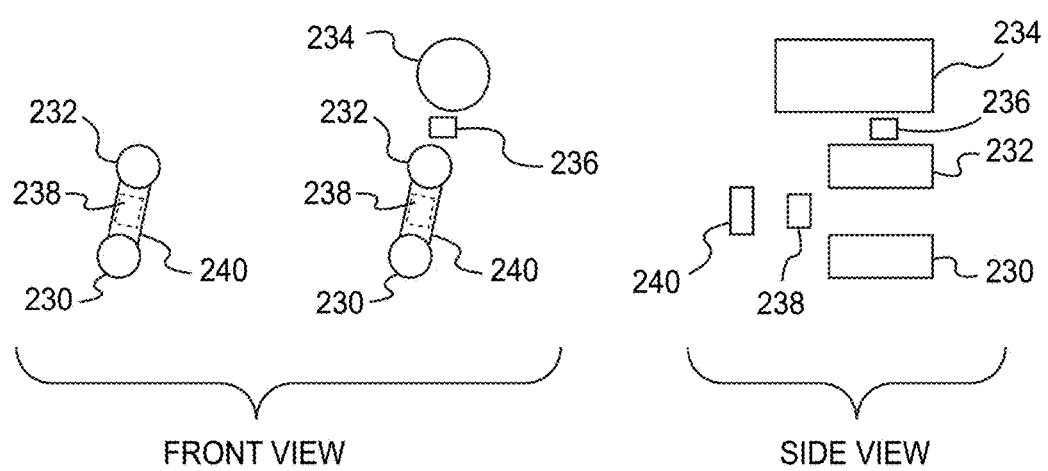
FIG. 2 is a diagram illustrating a front view and a side view an example of a monocular navigation system in accordance with aspects of the present disclosure.
Figure 3:
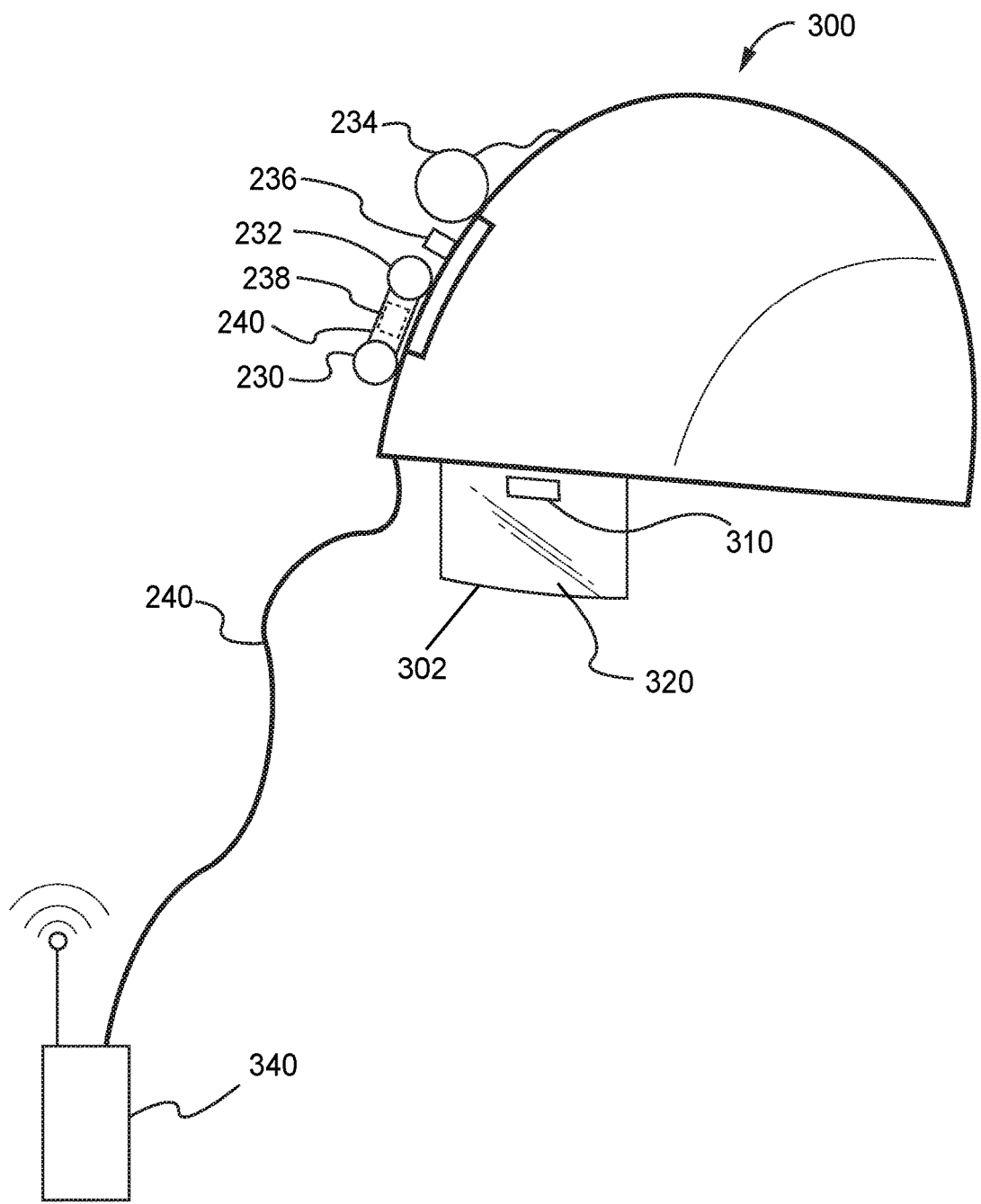
FIG. 3 is a diagram illustrating an example of an HMD system in accordance with aspects of the present disclosure.

FIG. 2 and FIG. 3 illustrate an overall system diagram of various aspects of example navigation system components (e.g., portions of a vision-inertial navigation system) for use in accordance with aspects of the present disclosure. The example navigation system of FIG. 2 and FIG. 3 may include, for example, a helmet-mounted display (HMD) 300 with two or more of a direct sunlight imaging apparatus 230, an indoor lighting imaging apparatus 232, or a night vision imaging apparatus 234 for capturing images (e.g., individual photos or frames of videos) of a an actual scene in a wide range of dynamic lighting conditions. In an aspect, the direct sunlight imaging apparatus 230 may include a first monocular camera (not shown) for capturing images in a first range of lighting conditions, the indoor lighting imaging apparatus 232 may include a second monocular camera (not shown) for capturing images in a second range of lighting conditions, and the night vision apparatus 234 may include a third monocular camera (not shown) for capturing images in a third range of lighting conditions.

Figure 4:
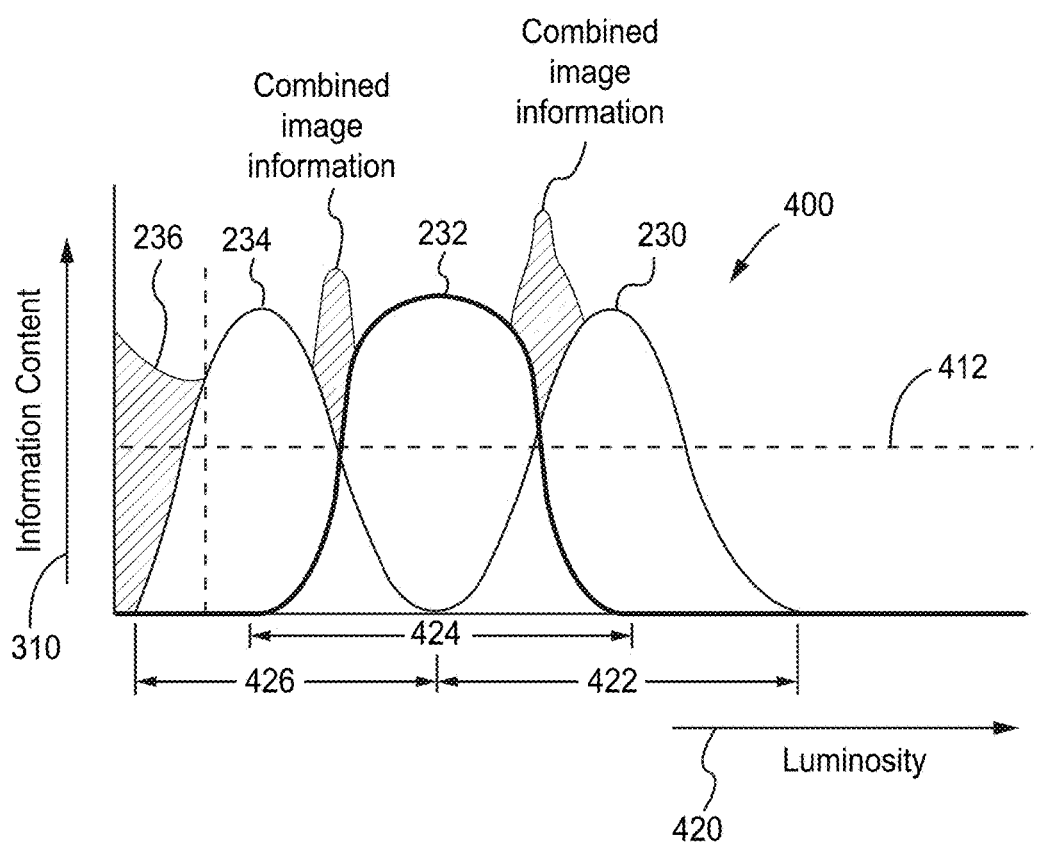
FIG. 4 is a plot illustrating an example of a wide dynamic range of a monocular navigation system in accordance with aspects of the present disclosure.

For example, referring to FIG. 4, the direct sunlight imaging apparatus 230 may capture images in the first range of lighting conditions (e.g., sunlight) 422. The indoor lighting imaging apparatus 232 may capture images in the second range of lighting conditions (e.g., indoor light) 424. The night vision imaging apparatus 234 may capture images in the third range of lighting conditions (e.g., low light) 426. The first range of lighting conditions 422 may be brighter than the second range of lighting conditions 424, and the second range of lighting conditions may be brighter than the third range of lighting conditions 426.

It is to be appreciated that a portion of the first range of lighting conditions 422 may overlap with a portion of the second range of lighting conditions 424 at a first overlapping region. In an aspect, both the direct sunlight imaging apparatus 230 and the indoor lighting imaging apparatus 232 may be configured to capture images in the first overlapping region. Similarly, the second range of lighting conditions 424 may overlap with the third range of lighting conditions 426 at a second overlapping region. In another aspect, both the indoor lighting imaging apparatus 232 and the night vision imaging apparatus 234 may be configured to capture images in the second overlapping region.

Moreover, it is to be appreciated that the night vision apparatus 234 is not able to capture images when there is no light present in an environment of the HMD 300. In this case, an illuminator 236 may be coupled to the night vision imaging apparatus 234 for selectively assisting in illumination of the environment of the HMD 300, for example, such that the night vision imaging apparatus 234 is able to capture images of the environment (e.g., actual scene). The illuminator 236 may comprise, for example, at least one light emitting diode (LED). The LED may operate in the ultraviolet (UV) range or in certain parts of the visible spectrum where the night vision imaging apparatus 234 is not sensitive.

Referring again to FIG. 2 and FIG. 3, the two or more of the direct sunlight imaging apparatus 230, the indoor lighting imaging apparatus 232, and/or the night vision imaging apparatus 234 may be mounted to the HMD 300. For example, in an aspect, the direct sunlight imaging apparatus 230 and the indoor lighting imaging apparatus 232 may be mounted to one or more side-mounted rails 330 of the HMD 300. In another aspect, the direct sunlight imaging apparatus 230, the indoor lighting apparatus 232, and the night vision imaging apparatus 234 may be mounted to the one or more side-mounted rails 330 of the HMD 300. In this aspect, the illuminator 236 may also be coupled to the night vision imaging apparatus 234. Further, in an aspect, each of the direct sunlight imaging apparatus 230, the indoor lighting apparatus 232, and the night vision apparatus 234 may be removably mounted to the one or more side-mounted rails 330 of the HMD 300. For example, the direct sunlight imaging apparatus 230, the indoor lighting imaging apparatus 232, and/or the night vision imaging apparatus 234 may be detachable from the one or more side-mounted rails 330 of the HMD 300.

The example navigation system of FIG. 2 and FIG. 3 may also include an inertial sensor 238. In an aspect, the inertial sensor 238 may also be mounted to the one or more side-mounted rails 330 of the HMD 300. The inertial sensor 238 may be or include, for example, aspects of the inertial measurement system described in U.S. Pat. No. 8,762,091, the content of which is hereby incorporated by reference in its entirety. The inertial sensor 238 may include an accelerometer for measuring a current rate of acceleration of the inertial sensor 238, and/or a gyroscope for measuring changes in rotational attributes (e.g., orientation) of the inertial sensor 238, and/or a pressure sensor for measuring a pressure associated with the inertial sensor 238. The inertial sensor 238 may also include a processing system for estimating a bias of the accelerometer, a bias of the gyroscope, and a bias of the pressure sensor. Such processing may also be performed remotely from these devices. In an aspect, the inertial sensor 238 may be configured to provide inertial measurements such as, the current rate of acceleration of the inertial sensor 238, the orientation of the inertial sensor 238, the bias of the accelerometer, the bias of the gyroscope, and the bias of the pressure sensor.

The example navigation system of FIG. 2 and FIG. 3 may also include a helmet-mounted display pod 302, comprising a display driver (not shown) and a gyroscope 310. In an aspect, the helmet-mounted display pod 302 may be mounted to, for example, a brow edge of the HMD 300. Further, the display driver (not shown) may be configured to display augmented reality information on a transparent display device 320, such as, but not limited to, a light wave guide optical element (LOE). For example, in an aspect, the display driver (not shown) may be configured to display 3D positions of visual landmarks (e.g., objects) in an environment of the HMD 300 on the LOE 320. The helmet-mounted display pod 302 may be adapted such that the LOE 320 is positioned in front of one of the eyes of a user of the HMD 300. Moreover, the display driver (not shown) may be configured to automatically adjust a brightness of augmented reality information displayed on the transparent display device 320. In an aspect, the gyroscope 310 of the helmet-mounted display pod 302 may be, for example, a three-axis micro-electro-mechanical systems (MEMS) gyroscope. The gyroscope 310 may be configured to measure and provide orientation data relating to changes in rotational attributes (e.g., pitch, roll, and/or yaw) of the helmet-mounted display pod 302.

Figure 10:
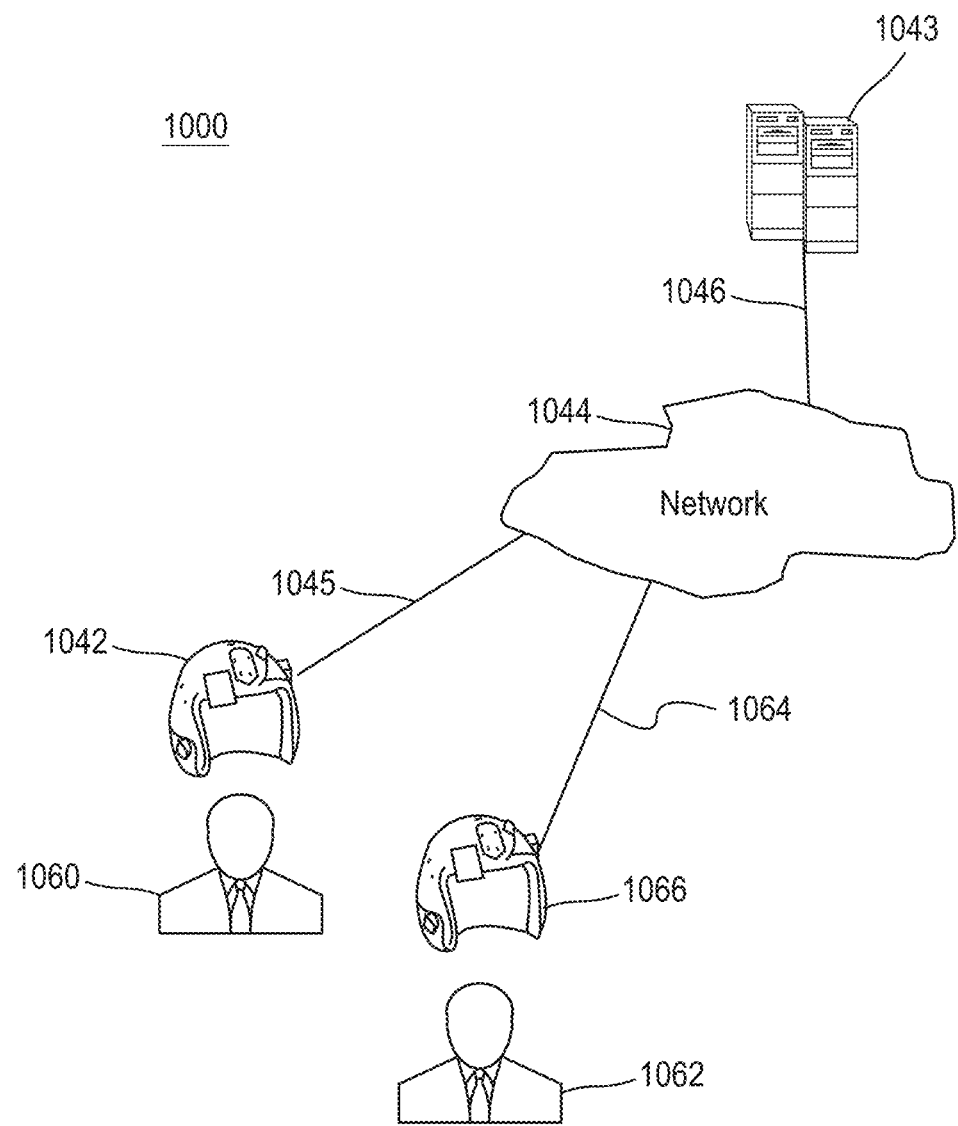
FIG. 10 is a block diagram illustrating various example system components for use in accordance with aspects of the present disclosure.

Still referring to FIG. 2 and FIG. 3, the example navigation system may also include a processing element 340. In an aspect, the processing element 340 may be coupled to and communicate with the helmet-mounted display pod 302, the inertial sensor 238, the direct sunlight imaging apparatus 230, the indoor lighting imaging apparatus 232, and, optionally, the night vision apparatus 234 via an interface box and one or more cables and/or wires 240 (e.g., one or more Universal Serial Bus (USB), Ethernet, and/or fiber optics cables). It is to be appreciated that the processing element 340 may be provided off location from the helmet. For example, in an aspect, the processing element 340 may not be mounted to the HMD 300 (FIG. 3). The processing element 340 may include a system on module (SOM), such as an embedded computer built on a single circuit board. The SOM may include a microprocessor with RAM, input/output controllers, and all other features needed for signal processing. In addition, the processing element 340 may include a Bluetooth® wireless transmitter/receiver, a Wi-Fi transmitter/receiver, an LTE transmitter/receiver, and/or an RFID transmitter/receiver for communication with external devices, such as, but not limited to, other navigation systems (as illustrated in FIG. 10). A battery (not shown) may also be coupled to the processing element 340 via, for example, cable and/or wire (not shown), and used to power one or more of the processing element 340, the direct sunlight imaging apparatus 230, the indoor lighting imaging apparatus 232, or the night vision imaging apparatus 234.

In an aspect, the processing element 340 may be configured to automatically detect a presence of two or more of the direct sunlight imaging apparatus 230, the indoor lighting imaging apparatus 232, or the night vision apparatus 234. The processing element 340 may then be configured to obtain image data from the detected two or more of the direct sunlight imaging apparatus 230, the indoor lighting imaging apparatus 232, or the night vision apparatus 234 via, e.g., the one or more cables and/or wires 240. The processing element 340 may further be configured to obtain inertial measurement data from the inertial sensor 238, as well as orientation data of the gyroscope 310 from the helmet-mounted display pod 302 via, e.g., the one or more cables and/or wires 240.

Figure 8:
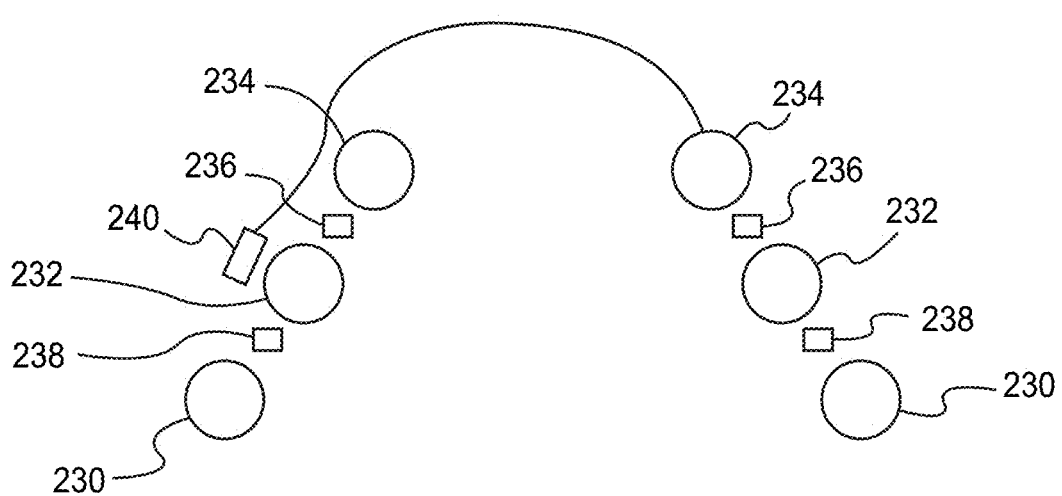
FIG. 8 is a diagram illustrating an example of a stereo navigation system in accordance with aspects of the present disclosure.

In an aspect, the processing element 340 may be configured to identify and track 3D positions of visual features in the image data obtained from the two or more of the direct sunlight imaging apparatus 230, the indoor lighting imaging apparatus 232, or the night vision apparatus 234. In this aspect, the processing element 340 may be further configured to provide the tracked 3D positions to the helmet-mounted display pod 302 via, e.g., the one or more cables and/or wires 240, so that the tracked 3D positions may be displayed on the LOE 320. In another aspect, the processing element 340 may be configured to automatically align an orientation of the inertial sensor 238 mounted on the HMD 300 with an orientation of the gyroscope 310 in the helmet-mounted display pod 302. Moreover, in another aspect, the processing element 340 may be configured to detect and automatically align a stereo camera configuration (as illustrated in FIG. 8) in order to improve robustness of the example navigation system.

Figure 5:
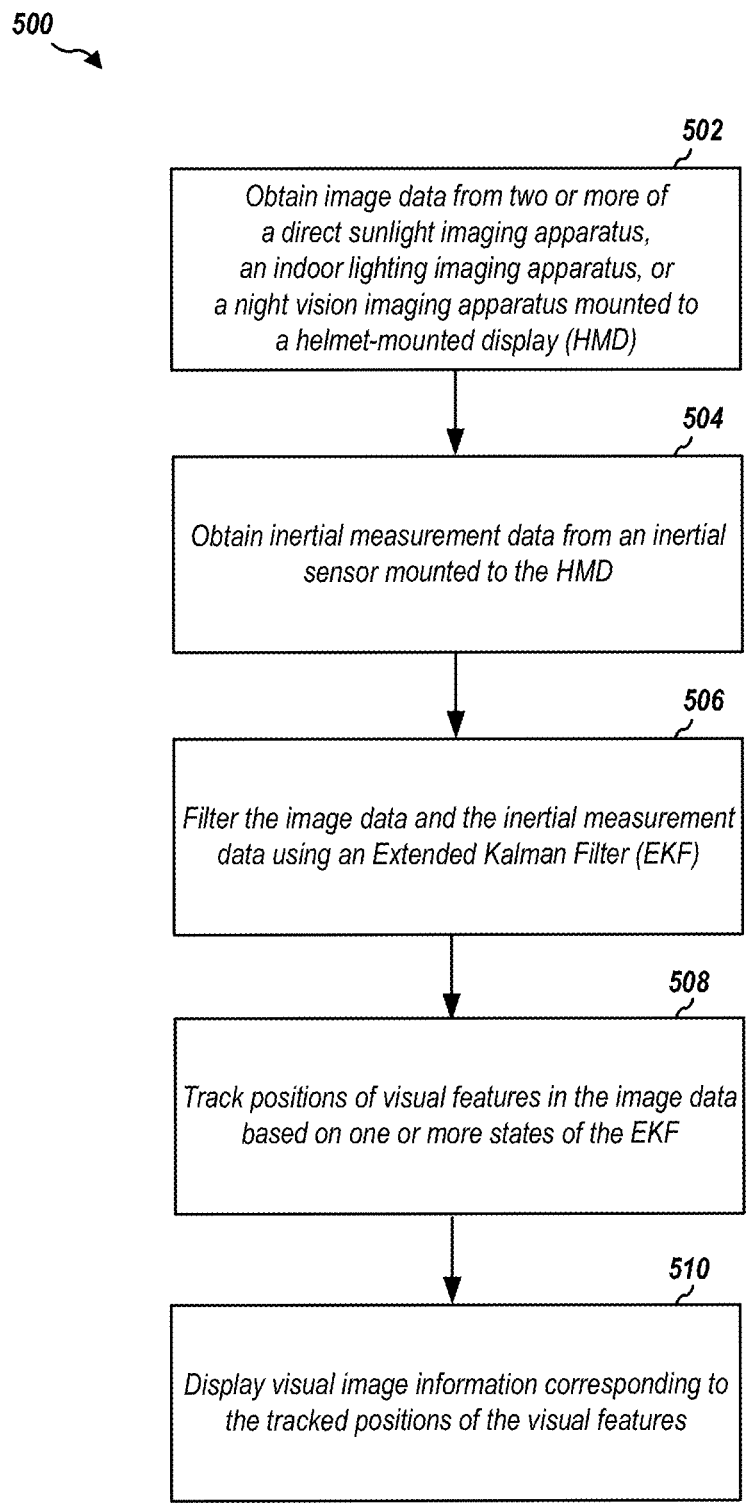
FIG. 5 is a flowchart of a method for tracking three-dimensional (3D) positions of visual features in accordance with aspects of the present disclosure.

FIG. 5 is a flowchart 500 of a method of tracking 3D positions of visual features in an environment of the HMD 300 and displaying the tracked 3D positions on corresponding landmarks in the environment of the HMD 300. The method may be performed by a navigation system (e.g., the example navigation system illustrated in FIG. 2 and FIG. 3).

In block 502, the processing element 340 (FIG. 3) of the navigation system may obtain image data from the two or more of the direct sunlight imaging apparatus 230 (FIG. 2), the indoor lighting imaging apparatus 232 (FIG. 2), or the night vision imaging apparatus 234 (FIG. 2) mounted to the HMD 300 (FIG. 3). For example, in an aspect, the processing element 340 (FIG. 3) may receive, e.g., via the one or more cables and/or wires 240 (FIG. 2), image data captured by the direct sunlight imaging apparatus 230 (FIG. 2) and the indoor lighting imaging apparatus 232 (FIG. 2). In another aspect, the processing element 340 may receive, e.g., via the one or more cables and/or wires 240 (FIG. 2), image data captured by the night vision imaging apparatus 234 (FIG. 2), as well as the image data captured by the direct sunlight imaging apparatus 230 (FIG. 2) and the indoor lighting imaging apparatus 232 (FIG. 2).

In an aspect, the processing element 340 (FIG. 3) may extract a set of N visual features from the image data obtained from the two or more of the direct sunlight imaging apparatus 230 (FIG. 2), the indoor lighting imaging apparatus 232 (FIG. 2), or the night vision imaging apparatus 234 (FIG. 2). The processing element 340 (FIG. 2) may then estimate a 3D location of each feature i in the set of N visual features with respect to the current camera pose. For example, in an aspect, the processing element 340 (FIG. 3) may estimate a first bearing vector ($\mu A_i$) to feature i and a first distance parameter ($\rho A_i$) of feature i relative to a pose of the direct sunlight imaging apparatus 230 (FIG. 2). Similarly, the processing element 340 (FIG. 3) may estimate a second bearing vector ($\mu B_i$) to feature i and a second distance parameter ($\rho B_i$) of feature i relative to a pose of the indoor lighting imaging apparatus 232 (FIG. 2).

In block 504, the processing element 340 (FIG. 3) may obtain the inertial measurement data from the inertial sensor 238 (FIG. 2) mounted to the HMD 300 (FIG. 3). For example, in an aspect, the processing element 340 (FIG. 3) may receive, from the inertial sensor 238, e.g., via the one or more cables and/or wires 340, (FIG. 3) the current rate of acceleration of the inertial sensor 238 (FIG. 2), the orientation (q) of the inertial sensor 238 (FIG. 2), the bias of the accelerometer (bf) in the inertial sensor 238 (FIG. 2), the bias of the gyroscope (bw) in the inertial sensor 238 (FIG. 2), and the bias of the pressure sensor (bp) in the inertial sensor 238 (FIG. 2). In an aspect, the processing element 340 may calculate the velocity (v) of the inertial sensor 238 (FIG. 2) by integrating the current rate of acceleration. The processing element 340 (FIG. 3) may further calculate the position (r) of the inertial sensor 238 (FIG. 2) by integrating the determined velocity (v).

In block 506, the processing element 340 (FIG. 3) may filter the image data obtained at, e.g., block 502 and the inertial measurement data obtained at, e.g., block 504 using an extended Kalman filter (EKF). For example, in an aspect, the processing element 340 (FIG. 3) may filter the image data and the inertial measurement data using the following filter state:

$$x: = (r, v, q, b_f, b_w, b_p, \mu A_0, \ldots, \mu A_n, \rho A_0, \ldots \rho A_n, \mu B_0, \ldots, \rho B_n, \rho B_0, \ldots \rho B_n)$$

r: position of inertial sensor
v: velocity of inertial sensor
q: orientation of inertial sensor
$b_f$: accelerometer bias
$b_w$: gyroscope bias
$b_p$: pressure sensor bias
$\mu A_i$: bearing vector to feature i
$\rho A_i$: distance parameter of feature i
$\mu B_i$: bearing vector to feature i
$\rho B_i$: distance parameter of feature i.

Using the EKF, the processing element 340 (FIG. 3) may process all of the image data (e.g., $\mu Ai$, $\rho Ai$, $\mu Bi$, and $\rho Bi$) and the inertial measurement data (e.g., r, v, q, bf, bw, and bp) to produce an overall best estimate of the 3D location for each feature i.

In block 508, the processing element 340 (FIG. 3) may track positions (e.g., the 3D locations) of each feature of the N visual features. For example, in an aspect, the processing element 340 (FIG. 3) may obtain new image data from the two or more of the direct sunlight imaging apparatus 230 (FIG. 2), the indoor lighting imaging apparatus 232 (FIG. 2), or the night vision imaging apparatus 234 (FIG. 2) at, e.g., block 502. The newly obtained image data may be captured from a different camera pose. For example, a pose of the two or more of the direct sunlight imaging apparatus 230 (FIG. 2), the indoor lighting imaging apparatus 232 (FIG. 2), or the night vision imaging apparatus 234 (FIG. 2) mounted to the HMD 300 (FIG. 3) may change as a user of the HMD turns their head left and/or right, moves to a new location, or otherwise adjusts the position and/or orientation of the HMD 300 (FIG. 3). Thus, the processing element 340 (FIG. 3) may re-estimate the 3D location of each feature i in the obtained image data with respect to the different camera pose. The processing element 340 (FIG. 3) may also obtain new inertial measurement data from the inertial sensor 238 (FIG. 2) at, e.g., block 504 as the user of HMD adjusts the position and/or orientation of the HMD 300 (FIG. 3). The processing element 340 (FIG. 3) may then update one or more parameters of the EKF filter state at, e.g., block 506 based on the newly obtained image data and/or inertial measurement data to produce a new overall best estimate of the 3D location of each feature i in the N visual features.

In block 510, the helmet-mounted display pod 302 may display the tracked 3D locations of the N visual features. In an aspect, the processing element 340 (FIG. 3) may be configured to continuously send the overall best estimate of the 3D location of each feature i of the N visual features to the helmet-mounted display pod 302 (FIG. 3). For example, the processing element 340 (FIG. 3) may send the overall best estimates of the 3D locations of the N visual features obtained at, e.g., block 508 to the helmet-mounted display pod 302 via the one or more cables and/or wires 240 (FIG. 2). The helmet-mounted display pod 302 (FIG. 3) may then be configured to assemble the overall best estimates of the 3D locations of the N visual features into representative positional visual image information and to display the representative positional visual image information on the LOE 320 (FIG. 3). For example, the representative positional visual image information may be displayed on the LOE 320 (FIG. 3) such that, from the user of the HMD's perspective, the estimated location of each visual feature is projected onto the corresponding landmark in the real world.

In an additional or alternative aspect, the helmet-mounted display pod 302 may be configured to display visual image information representing a position of the user (e.g., HMD 300) on the LOE 320 (FIG. 3). For example, in an aspect, the processing element 340 (FIG. 3) may estimate a position of the HMD 300 relative to where it started based on the tracked 3D locations of the N visual features. It is to be appreciated that the helmet-mounted display pod 302 may also be configured to display other visual image information relating to the user's and/or visual feature's position.

Figure 6:
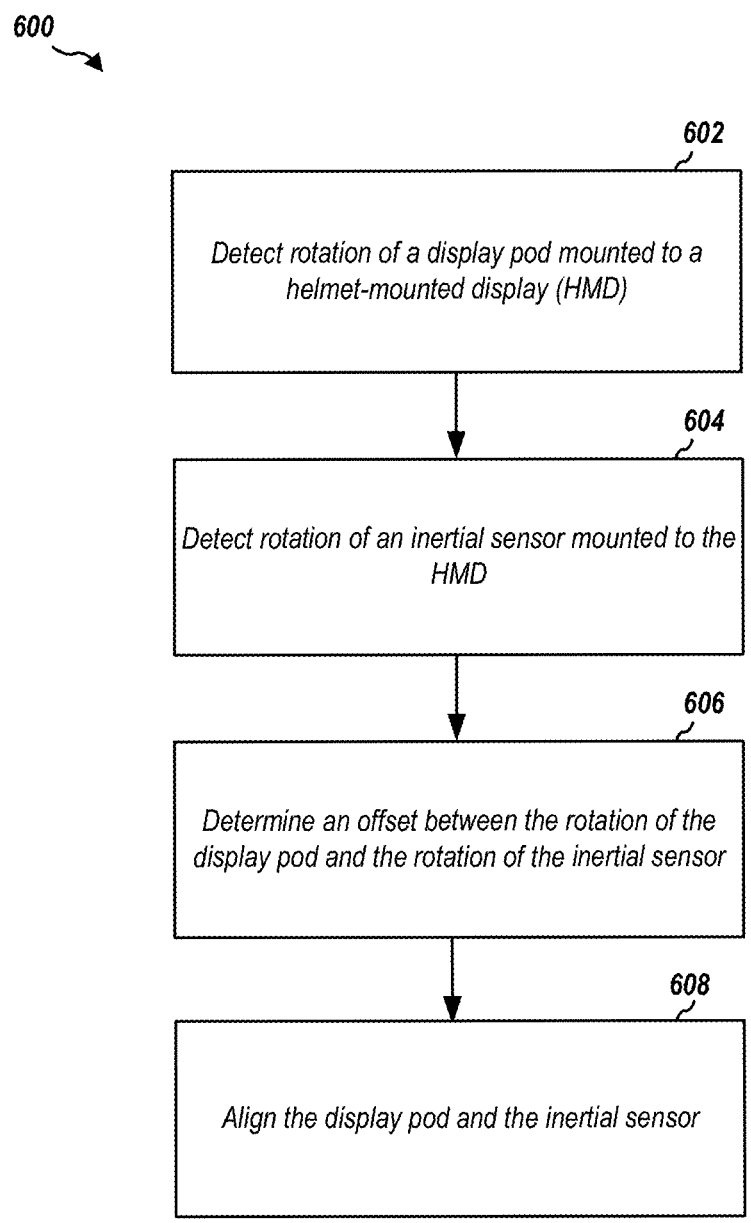
FIG. 6 is a flowchart of a method for performing boresight calibration between a display device and an inertial sensor mounted to a HMD system in accordance with aspects of the present disclosure.

FIG. 6 is a flowchart 600 of a method of automatically performing boresight calibration between the inertial sensor 238 (FIG. 2) and the helmet-mounted display pod 302 (FIG. 3) in the example navigation system of FIG. 2 and FIG. 3. For example, in an aspect, an orientation (e.g., rotation) of the inertial sensor 238 (FIG. 2) and an orientation of the helmet-mounted display pod 302 (FIG. 3) may automatically be aligned so that the visual information representing the estimated location of each feature is accurately projected onto the corresponding landmark in the actual scene.

In block 602, the gyroscope 310 (FIG. 3) may be configured to detect a rotation of the helmet-mounted display pod 302 (FIG. 3) mounted to the HMD 300 (FIG. 3). For example, a first user of the HMD 300 (FIG. 3) may mount the helmet-mounted display pod 302 (FIG. 3) at a first mounting angle relative to the brow edge of the HMD 300 (FIG. 3) so that the LOE 320 (FIG. 3) of the helmet-mounted display pod 302 (FIG. 3) is positioned in front of an eye of the first user. However, a second user of the HMD 300 (FIG. 3) may select to mount the helmet-mounted display (FIG. 3) at a second mounting angle relative to the brow edge of the HMD 300 (FIG. 3) so that the LOE 320 (FIG. 3) is positioned in front of an eye of the second user. Thus, the second user of the HMD 300 (FIG. 3) may move (e.g., rotate) the helmet-mounted display pod 302 (FIG. 3) from the first mounting location to the second mounting location. In addition, the helmet-mounted display pod 302 of the HMD 300 (FIG. 3) may rotate as the second user moves his or her head left, right, up, and/or down. In an aspect, the gyroscope 310 (FIG. 3) in the helmet-mounted display pod 302 (FIG. 3) may detect and measure the rotation (e.g., roll, pitch, and yaw) of the helmet-mounted display pod 302 (FIG. 3).

In block 604, a gyroscope (not shown) in the inertial sensor 238 (FIG. 2) may be configured to detect a rotation of the inertial sensor 238 (FIG. 2) mounted to the HMD 300 (FIG. 3). The inertial sensor 238 may rotate, for example, as the second user of the HMD 300 moves their head left, right, up, and/or down. In an aspect, the gyroscope in the inertial sensor 238 (FIG. 2) may detect and measure the rotation of the inertial sensor 238 (FIG. 2).

It is to be appreciated that the inertial sensor 238 (FIG. 2) may be mounted on the HMD 300 (FIG. 3) in close proximity (e.g., within a couple inches) of the two or more of the direct sunlight imaging apparatus 230 (FIG. 2), the indoor lighting imaging apparatus 232 (FIG. 2), or the night vision imaging apparatus 234 (FIG. 2). Thus, the rotation of the inertial sensor 238 (FIG. 2) may approximately correspond to the rotation of the two or more of the direct sunlight imaging apparatus 230 (FIG. 2), the indoor lighting imaging apparatus 232 (FIG. 2), or the night vision imaging apparatus 234 (FIG. 2).

In block 606, the processing element 340 (FIG. 3) may be configured to determine an offset between the rotation of the helmet-mounted display pod 302 (FIG. 3) and the rotation of the inertial sensor 238 (FIG. 2) based on the rotation information obtained at, e.g., blocks 602 and 604. In an aspect, the processing element 340 (FIG. 3) may obtain the rotation information from both the gyroscope 310 (FIG. 3) in the helmet-mounted display pod 302 (FIG. 3) and the gyroscope (not shown) in the inertial sensor 238 (FIG. 2) via, e.g., the interface box and one or more cables and/or wires 240 (FIG. 2). In an aspect, the processing element 340 may calculate a rotational offset between the rotation of the gyroscope 310 (FIG. 3) in the helmet-mounted display pod 302 (FIG. 3) and the rotation of the gyroscope in the inertial sensor 238 (FIG. 2) relative to, e.g., the ground plane.

In block 608, the processing element 340 (FIG. 3) may be configured to align (e.g., calibrate) the rotation of the gyroscope 310 (FIG. 3) in the helmet-mounted display pod 302 (FIG. 3) with the rotation of the gyroscope in the inertial sensor 238 (FIG. 2). For example, in an aspect, the processing element 340 may be configured to adjust the rotation of the gyroscope 310 (FIG. 3) and/or the rotation of the inertial sensor 238 (FIG. 2) such that the rotational offset between the gyroscopes reduces to zero.

It is to be appreciated that method 600 of automatically aligning an orientation of the inertial sensor 238 (FIG. 2) with an orientation of the gyroscope 310 (FIG. 3) may be implemented before, during, and/or after the method 500 (FIG. 5) of tracking and displaying 3D positions of visual features in an environment of the HMD 300 is executed by the processing element 340 (FIG. 3).

Figure 7:
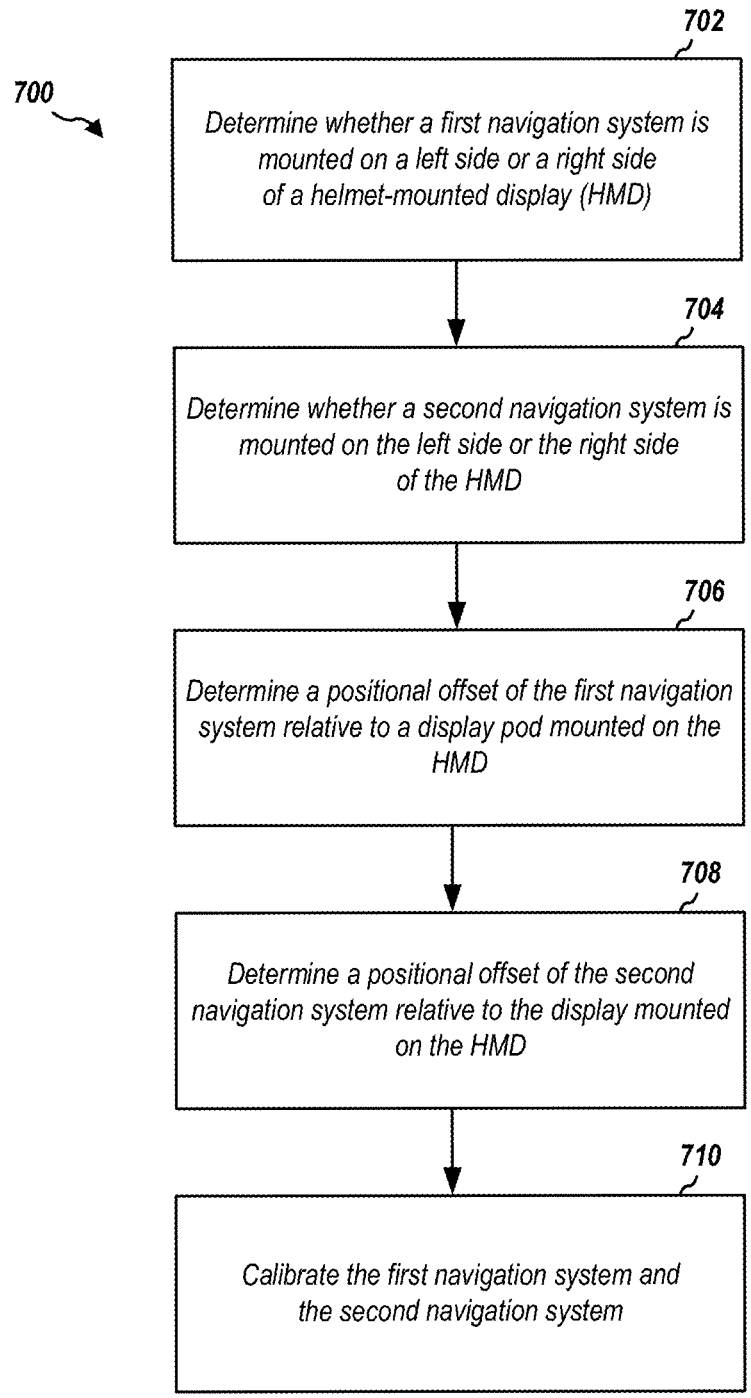
FIG. 7 is a flowchart of a method for calibrating a stereo navigation system in accordance with aspects of the present disclosure.

FIG. 7 is a flowchart 700 of a method of detecting and automatically calibrating a stereo camera configuration (e.g., a first monocular navigation system and a second monocular navigation system), in accordance with aspects of the present disclosure. For example, in an aspect, referring to FIG. 8, first monocular navigation system 810 may include inertial sensor 238 (FIG. 2) and two or more of a direct sunlight imaging apparatus 230 (FIG. 2), an indoor lighting imaging apparatus 232 (FIG. 2), or a night vision imaging apparatus 234 (FIG. 2) mounted to the first side of the HMD 300 (FIG. 3). In this aspect, second monocular navigation system 820 may include inertial sensor 238 (FIG. 2) and two or more of the direct sunlight imaging apparatus 230 (FIG. 2), the indoor lighting imaging apparatus 232 (FIG. 2), and/or the night vision imaging apparatus 234 (FIG. 2) mounted to the second side of the HMD 300 (FIG. 3). In an aspect, the helmet-mounted display pod 302 (FIG. 3) may also be mounted to the brow edge of the HMD 300 (FIG. 3). For example, in an aspect, the first monocular navigation system 810 may be mounted to the first side of the HMD 300 at a first positional offset relative to the helmet-mounted display pod 302 (FIG. 3). Similarly, in this aspect, the second monocular navigation system 820 may be mounted to the second side of the HMD 300 at a second positional offset (e.g., a positional offset greater than the first positional offset) relative to the helmet-mounted display pod 302 (FIG. 3). Further, in an aspect, the processing element 340 may be coupled to and communicate with the first monocular navigation system 810, the second monocular navigation system 820, and/or the helmet-mounted display pod 302 (FIG. 3).

Moreover, it is to be appreciated that the use of a stereo camera configuration may improve robustness, as well as provide other features and/or advantages. For example, in an aspect, the first monocular navigation system 810 and the second monocular navigation system 820 may each be configured to independently track the position and orientation of visual landmarks in an environment of the HMD 300 as described herein with respect to FIG. 5. If the first monocular navigation system 810 and the second monocular navigation system 820 are calibrated, then the processing element 340 may combine information obtained from the first monocular navigation system 810 and the second monocular navigation system 820 to more accurately estimate positions of visual landmarks and/or a position of the user (e.g., the stereo navigation system). The helmet-mounted display pod 302 (FIG. 3) may then be configured to superimpose the estimated positions of the visual landmarks onto the corresponding landmark in the actual scene and/or the estimated position of the user on the actual scene, as well as other information relating to the user's and/or landmark's position.

Referring again to FIG. 7, a method of detecting and automatically calibrating the first monocular navigation system 810 (FIG. 8) and the second monocular navigation system 820 (FIG. 8) for use in accordance with aspects of the present disclosure is illustrated. In block 702, the processing element 340 (FIG. 3) may be configured to determine whether the first monocular navigation system 810 (FIG. 8) is mounted on a left side or a right side of the HMD 300 (FIG. 3). For example, in an aspect, a first accelerometer in the first inertial sensor of the first monocular navigation system 810 (FIG. 8) may measure an acceleration (e.g., g-force) of the first inertial sensor. The first inertial sensor may send a value of the acceleration to the processing unit 340 (FIG. 3). The processing unit 340 (FIG. 3) may then determine whether the value of the acceleration is positive or negative. If the acceleration is a positive value, then the processing unit 340 may determine that the first navigation system is mounted on the left side of the helmet (e.g., the first inertial sensor is mounted upside-down). If the acceleration is a negative value, then the processing unit 340 may determine that the second navigation system is mounted on the right side of the helmet (e.g., the first inertial sensor is mounted downside-down).

In block 704, the processing element 340 (FIG. 3) may be configured to determine whether the second monocular navigation system 820 (FIG. 8) is mounted on the left side or the right side of the HMD 300 (FIG. 3). For example, in an aspect, a second accelerometer in the second inertial sensor of the second monocular navigation system 820 (FIG. 8) may measure an acceleration (e.g., g-force) of the second inertial sensor. The second inertial sensor may send a value of the acceleration to the processing unit 340 (FIG. 3). The processing unit 340 (FIG. 3) may then determine whether the value of the acceleration is positive or negative. If the acceleration is a positive value, then the processing unit 340 may determine that the second navigation system is mounted on the left side of the helmet (e.g., the second inertial sensor is mounted upside-down). If the acceleration is a negative value, then the processing unit 340 (FIG. 3) may determine that the second navigation system is mounted on the right side of the helmet (e.g., the second inertial sensor is mounted downside-down).

In block 706, the processing element 340 (FIG. 3) may be configured to determine a positional offset of the first monocular navigation system 810 relative to the helmet-mounted display pod 302 (FIG. 3). In an aspect, the positional offset of the first monocular navigation system 810 may be a value stored in, e.g., a table or data array. For example, upon determining at, e.g., block 702 that the first navigation system is mounted to the left side or the right side of the HMD 300 (FIG. 3), the processing element 340 (FIG. 3) may retrieve either a first positional offset or a second positional offset corresponding to the left side and the right side, respectively, from the table or data array.

In block 708, the processing element 340 (FIG. 3) may be configured to determine a positional offset of the second monocular navigation system 820 relative to the helmet-mounted display pod 302 (FIG. 3). In an aspect, the positional offset of the second monocular navigation system 820 may be a value stored in, e.g., a table or data array. For example, upon determining at, e.g., block 702 that the second navigation system is mounted to the left side or the right side of the HMD 300 (FIG. 3), the processing element 340 (FIG. 3) may retrieve either the first positional offset or the second positional offset corresponding to the left side and the right side, respectively, from the table or data array.

In block 710, the processing element 340 (FIG. 3) may be configured to align the first monocular navigation system 810 (FIG. 8) and the second monocular navigation system 820 (FIG. 8). For example, in an aspect, the processing element 340 (FIG. 3) may automatically align (e.g., calibrate) the first monocular navigation system 810 (FIG. 8) with the helmet-mounted display pod 302 (FIG. 3) of the HMD 300 (FIG. 3) based on the positional offset of the first monocular navigation system determined at, e.g., block 706. The processing element may similarly calibrate the second monocular navigation system 820 (FIG. 8) with the helmet-mounted display pod 302 (FIG. 3) of the HMD 300 (FIG. 3) based on the positional offset of the second monocular navigation system 820 determined at, e.g., block 708. Accordingly, the relative positions of the first monocular navigation system 810 (FIG. 8) and the second monocular navigation system 820 (FIG. 8) may be aligned with each other.

Figure 9:
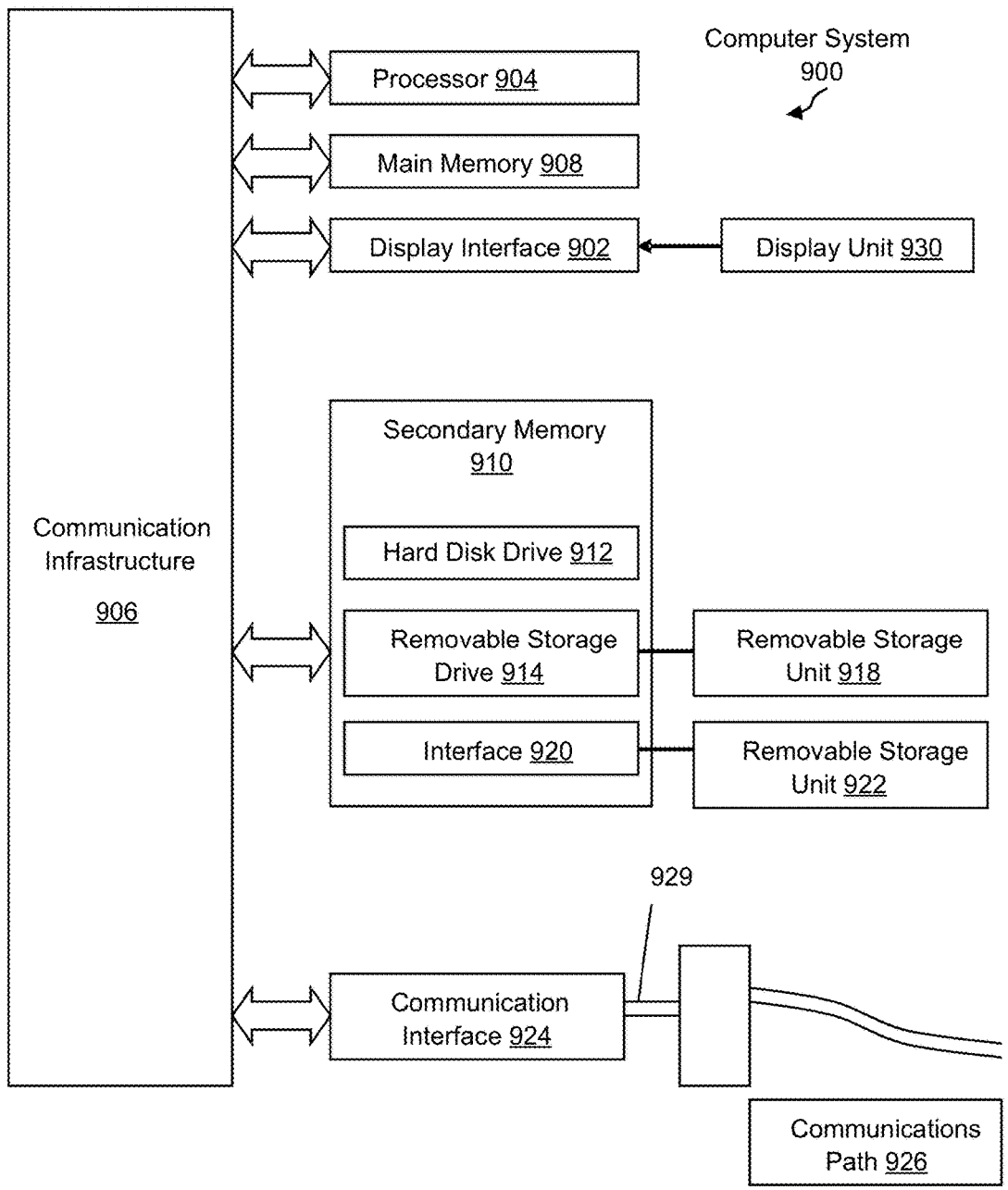
FIG. 9 is a diagram illustrating example aspects of a hardware implementation for a system employing a processing system in accordance with aspects of the present disclosure.

FIG. 9 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIG. 5, FIG. 6, and FIG. 7. An example of such a computer system 900 is shown in FIG. 9.

Computer system 900 includes one or more processors, such as processor 904. The processor 904 may correspond to the processing element 340 described in connection with FIG. 2 and FIG. 3. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 928. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 904 to perform the features presented herein. Accordingly, such computer programs represent controllers of the computer system 900.

In aspects implemented using software, the software may be stored in a computer program product and loaded into computer system 900 using removable storage drive 914, hard drive 912, or communications interface 920. The control logic (software), when executed by the processor 904, causes the processor 904 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

FIG. 10 illustrates a block diagram of various example system components that may be used in accordance with aspects of the present disclosure. The system 1000 includes one or more accessors 1060, 1062 (also referred to interchangeably herein as one or more "users") and one or more terminals 1042, 1066 (such terminals may be or include, for example, various features of the navigation system illustrated in FIG. 2, FIG. 3, and FIG. 8). In one aspect, data for use in accordance with aspects of the present disclosure is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for vision-inertial navigation, comprising:
receiving image data from each of a first sunlight imaging apparatus for capturing images in a first range of lighting conditions, a first indoor lighting imaging apparatus for capturing images in a second range of lighting conditions, and a first night vision imaging apparatus for capturing images in a third range of lighting conditions of a first navigation subsystem, wherein the image data captures visual features of an environment, and wherein the first range of lighting conditions, the second range of lighting conditions, and the third range of lighting conditions are different from one another;
receiving first inertial measurement data from a first inertial sensor (IMU) of the first navigation subsystem;
tracking positions of the visual features based on the image data received from the first sunlight imaging apparatus, the first indoor lighting imaging apparatus, and the first night vision imaging apparatus and the first inertial measurement data received from the first IMU;
assembling a plurality of the tracking positions into representative positional visual image information; and
displaying the representative positional visual image information.

2. The method of claim 1, further comprising:
applying an Extended Kalman Filter (EKF) to at least one of the image data received from the first sunlight imaging apparatus, the first indoor lighting imaging apparatus, and the first night vision imaging apparatus and the first inertial measurement data received from the first IMU.

3. The method of claim 1, wherein:
the first sunlight imaging apparatus, the first indoor lighting imaging apparatus, and the first night vision imaging apparatus are mounted to a helmet-mounted display (HMD); and
the first IMU is mounted to the HMD.

4. The method of claim 3, further comprising:
sending the representative positional visual image information to a display pod mounted to the HMD, wherein the display pod is configured to display the representative positional visual image information on a transparent display device.

5. The method of claim 4, further comprising:
receiving at least a portion of the image data from two or more selected from a group consisting of a second sunlight imaging apparatus, a second indoor lighting imaging apparatus, and a second night vision imaging apparatus of a second navigation subsystem; and
receiving second inertial measurement data from a second IMU of the second navigation subsystem, wherein:
the two or more of the second sunlight imaging apparatus, the second indoor lighting imaging apparatus, and the second night vision imaging apparatus of the second navigation subsystem are mounted to the HMD, and
the second IMU of the second navigation subsystem is mounted to the HMD.

6. The method of claim 5, wherein tracking positions of the visual features is further based on the image data received from the two or more of the second sunlight imaging apparatus, the second indoor lighting imaging apparatus, and the second night vision imaging apparatus and the second inertial measurement data received from the second IMU.

7. The method of claim 5, further comprising:
determining a rotational offset between a rotation of the display pod and a rotation of at least one of the first IMU and the second IMU; and
aligning the display pod and the at least one of the first IMU and the second IMU such that the rotational offset is reduced.

8. The method of claim 5, further comprising:
determining whether the first navigation subsystem is mounted to a left side or a right side of the HMD;
determining whether the second navigation subsystem is mounted to the left side or the right side of the HMD; and
calibrating the first navigation subsystem and the second navigation subsystem based on whether each subsystem is mounted on the left side or the right side.

9. A vision-inertial navigation system, comprising:
a first navigation subsystem including:
a first sunlight imaging apparatus for capturing images in a first range of lighting conditions, a first indoor lighting imaging apparatus for capturing images in a second range of lighting conditions, and a first night vision apparatus for obtaining image data for capturing images in a third range of lighting conditions, wherein the image data captures visual features of an environment, and wherein the first range of lighting conditions, the second range of lighting conditions, and the third range of lighting conditions are different from one another, and
a first inertial measurement unit (IMU) for obtaining inertial measurement data associated with the first navigation subsystem;
a memory configured to store instructions; and
a processor communicatively coupled to the memory and the first navigation subsystem, the processor being configured to execute the instructions to:

receive the image data from the first sunlight imaging apparatus, the first indoor lighting imaging apparatus, or the first night vision imaging apparatus;

receive the inertial measurement data from the first IMU;

track positions of the visual features based the image data received from the first sunlight imaging apparatus, the first indoor lighting imaging apparatus, and the first night vision imaging apparatus and the inertial measurement data received from the first IMU;

assemble a plurality of the tracking positions into representative positional visual image information; and display the representative positional visual image information.

10. The vision-inertial navigation system of claim 9, wherein:

at least one light emitting diode (LED) is coupled to the first night vision imaging apparatus for illuminating the environment.

11. The vision-inertial navigation system of claim 9, wherein the processor is further configured to:

apply an Extended Kalman Filter (EKF) to at least one of the image data received from the first sunlight imaging apparatus, the first indoor lighting imaging apparatus, and the first night vision imaging apparatus and the first inertial measurement data received from the first IMU.

12. The vision-inertial navigation system of claim 9, further comprising:

a helmet-mounted display (HMD), wherein the first IMU and the first sunlight imaging apparatus, the first indoor lighting imaging apparatus, and the first night vision imaging apparatus are mounted to the HMD.

13. The vision-inertial navigation system of claim 12, further comprising:

a display pod mounted to the HMD, wherein the processor is communicatively coupled to the display pod and the processor is further configured to:

send the representative positional visual image information to the display pod, the display pod being configured to display the representative positional visual image information on a transparent display device.

14. The vision-inertial navigation system of claim 13, further comprising:

a second navigation subsystem including:

two or more selected from a group consisting of a second sunlight imaging apparatus, a second indoor lighting imaging apparatus, and a second night vision apparatus for obtaining at least a portion of the image data, wherein the two or more of the second sunlight imaging apparatus, the second indoor lighting imaging apparatus, and the second night vision apparatus are mounted to the HMD;

a second IMU for obtaining inertial measurement data associated with the second navigation subsystem, wherein the second IMU is mounted to the HMD;

wherein the processor is communicatively coupled to the second navigation subsystem and further configured to:

receive at least the portion of the image data from the two or more selected from the second sunlight imaging apparatus, the second indoor lighting imaging apparatus, and the second night vision imaging apparatus; and receive the inertial measurement data from the second IMU.

15. The vision-inertial navigation system of claim 14, wherein:

at least one light emitting diode (LED) is coupled to the second night vision imaging apparatus for illuminating the environment.

16. The vision-inertial navigation system of claim 14, wherein the processor is further configured to track the positions of the visual features based on the image data received from the two or more of the second sunlight imaging apparatus, the second indoor lighting imaging apparatus, and the second night vision imaging apparatus and the inertial measurement data received from the second IMU.

17. The vision-inertial navigation system of claim 14, wherein the processor is further configured to:

determine a rotational offset between a rotation of the display pod and a rotation of at least one of the first IMU and the second IMU; and align the display pod and the at least one of the first IMU and the second IMU such that the rotational offset is reduced.

18. The vision-inertial navigation system of claim 14, wherein the processor is further configured to:

determine whether the first navigation subsystem is mounted to a left side or a right side of the HMD; and determine whether the second navigation subsystem is mounted to the left side or the right side of the HMD.

19. The vision-inertial navigation system of claim 18, wherein the processor is further configured to:

determine a first positional offset of the first navigation subsystem relative to a position of the display pod, the first positional offset being determined based on whether the first navigation subsystem is mounted on the left side or the right side of the HMD;

determine a second positional offset of the second navigation subsystem relative to the position of the display pod, the second positional offset being determined based on whether the second navigation subsystem is mounted on the left side or the right side of the HMD; and calibrate the first navigation subsystem and the second navigation subsystem based on the first positional offset and the second positional offset.

20. The vision-inertial navigation system of claim 18, wherein:

to determine whether the first navigation subsystem is mounted on the left side or the right side of the HMD, the processor is further configured to determine whether an acceleration measured by an accelerometer in the first IMU is a positive or negative value, and to determine whether the second navigation subsystem is mounted on the left side or the right side of the HMD, the processor is further configured to determine whether an acceleration measured by an accelerometer in the second IMU is a positive or negative value.

* * * * *